Jan. 7, 1958     R. L. FRANK     2,819,462
AUTOMATIC FREQUENCY CONTROL SYSTEM
Filed March 25, 1954
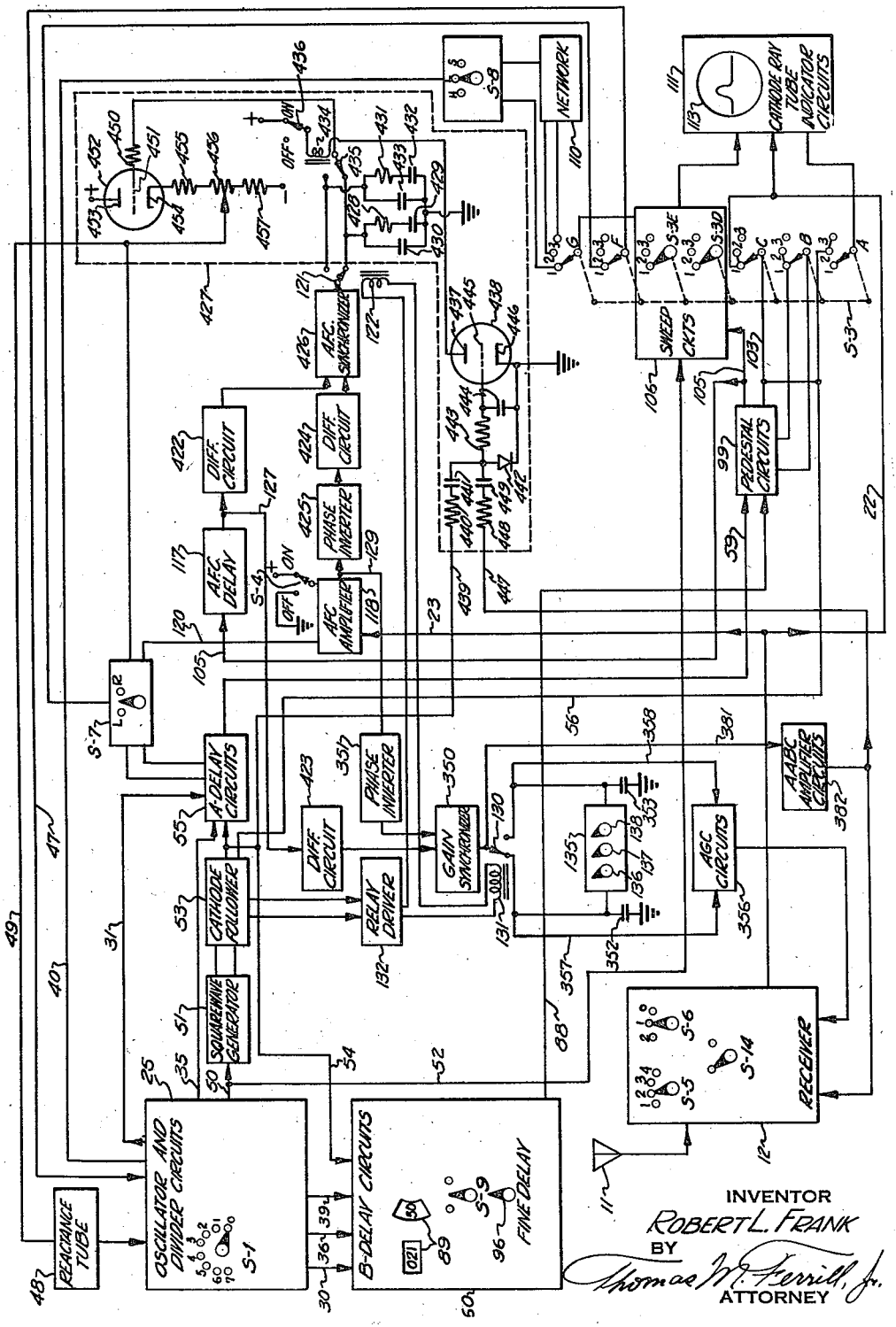
INVENTOR
ROBERT L. FRANK
BY
Thomas M. Ferrill, Jr.
ATTORNEY

2,819,462

Patented Jan. 7, 1958

2,819,462

AUTOMATIC FREQUENCY CONTROL SYSTEM

Robert L. Frank, Great Neck, N. Y., assignor to Sperry Rand Corporation, a corporation of Delaware Application March 25, 1954, Serial No. 418,680

10 Claims. (Cl. 343—103)

The present invention relates to automatic frequency control systems, and in particular to an improved automatic frequency control system useful in loran receiver-indicators.

In Patent 2,636,988 there is shown and described an automatic frequency control system for a loran receiver-indicator wherein a highly stable reference oscillator is automatically synchronized to the received master pulses. The A. F. C. system includes a cascade of frequency dividers coupled to the output of the precision reference oscillator for producing first recurrent pulses which are positioned in time in order to be brought into coincidence with a differentiated version of the received master pulse voltage. Thereafter, these recurrent pulses are maintained in synchronism with the received master pulse voltage by automatically controlling the frequency of the precision reference oscillator in response to a control voltage varying in accordance with the relative time difference between the recurrent pulses and the differentiated version of the received master pulse voltage. A similar A. F. C. system is employed in the loran receiver-indicator of Patent 2,651,033.

The loran receiver-indicator of Patent 2,651,033 further includes adjustable time delay circuits coupled to the frequency dividers for producing second recurrent pulses whose time position relative to the first recurrent pulses is manually adjustable in order that they may be brought into coincidence with a differentiated version of the received slave pulse voltage. Thereafter, the delayed recurrent second pulses may be maintained in synchronism with the received slave pulse voltage, as the loran receiver-indicator is moved in space, either by manual adjustment of the time delay circuits or by the automatic tracking system shown and described in copending application S. N. 267,347, filed on January 21, 1952, now Patent 2,697,219, in the name of Roger B. Williams, Jr., entitled "Automatic Time Difference Measuring Circuits," and assigned to the same assignee as the present invention. The time difference between the arrival of the master and slave pulses is the time difference interval between the first recurrent pulses and the delayed second recurrent pulses. This time delay difference is indicated by a time delay counter coupled to the adjustable time delay circuits.

In these prior art loran receiver-indicators, the loss of reception of the master pulses due to fading or to improper master transmitter operation results in the loss of synchronization of the precision reference oscillator. Moreover, for the condition where the received master pulses are of the same order of magnitude as the received noise, the precision reference oscillator may not be as accurately and reliably synchronized to the received master pulses as desired. Since the transmitter of the slave station must of necessity be accurately synchronized to the master transmitter, a method has been discovered by which the precision reference oscillator of a loran receiver-indicator may be synchronized with either the received master pulses or the received slave pulses. Furthermore, this improved synchronization of the precision reference oscillator can be automatically controlled by the stronger of the received master or slave pulse signals.

Accordingly, a principal object of the present invention is to automatically control the frequency of the precision reference oscillator of a loran receiver-indicator with the stronger of the received master or slave pulses.

Another object is to automatically control the frequency of the precision reference oscillator of a loran receiver-indicator with the received loran signals from either the master or the slave station when the received signals from one of the stations is unsuitable for synchronizing purposes.

Another object of the invention is to improve the accuracy and reliability of the time difference measurements obtained by a loran receiver-indicator.

In accordance with the present invention there is introduced an automatic frequency control system for controlling the frequency of a precision reference oscillator from the stronger of applied first and second pulse voltages. The automatic frequency control system is responsive to the coincidence or relative time difference between the applied first pulse voltage and a first output from the precision reference oscillator to produce a first output frequency control voltage, and the system is further responsive to the coincidence or relative time difference between the applied second pulse voltage and a delayed second output from said precision reference oscillator to produce a second output frequency control voltage. A selector circuit receiving the first and second frequency control voltages is responsive to the strength of the applied first and second pulse voltages to select the frequency control voltage produced by the stronger of the applied first and second pulse voltages. The selected frequency control voltage is supplied to a frequency control circuit for automatically maintaining the frequency of the precision reference oscillator synchronized with the stronger of the applied pulse voltages.

The above objects of and the brief introduction to the present invention will be more fully understood and further objects and advantages will become apparent from a careful study of the following detailed description in connection with the drawing, wherein the single figure illustrates a combination block and schematic diagram of a loran receiver-indicator employing the improved automatic frequency control system of the present invention.

Those elements in the accompanying drawing fully corresponding to those in the aforesaid Patent 2,651,033 are identified by the same reference numerals as employed therein.

Referring to the single figure, loran A and B pulses of carrier-wave energy from remote master and slave stations are collected by antenna 11 and supplied to the input of superheterodyne receiver 12. Receiver 12 is identical to the receiver shown and described in the aforesaid Patent 2,651,033. The received A and B pulses are amplified, detected, and supplied as positive A and B pulses over lead 22 to the cathode-ray tube indicator circuits 111, and over lead 23 to an input of the A. F. C. amplifier 118. An automatic amplitude balance control voltage from the AABC amplifier circuits 382 is supplied to the amplitude balance restorer in receiver 12 as will be explained more fully hereinafter. An automatic gain control voltage from the AGC circuits 356 also is supplied to receiver 12 as will be explained hereinafter.

The precision timing circuits of the loran receiver-indicator comprise the oscillator and divider circuits 25, the square-wave generator 51, the A delay circuits 55, and the B delay circuits 60. These circuits are similar to those described and claimed in application S. N. 633,473, filed December 7, 1945, now Patent No.

2,731,634, issued January 17, 1956, in the name of Winslow Palmer, entitled "Timing Apparatus" and assigned to the same assignee as the present invention. They are identical with those shown and described in the aforesaid Patent 2,651,033, and, therefore, will be described only briefly in the present specification.

Oscillator and divider circuits

The conventional oscillator and divider circuits of block 25 comprise a crystal-controlled oscillator operating at a frequency of 100 kilocycles-per-second, and a cascade of five frequency dividers, dividing the frequency of the oscillator output voltage in the steps of 5, 4, 5, 5, and 4, respectively, followed by a transient delay circuit. These frequency divider circuits supply the basic timing voltages for the loran receiver-indicator. The output voltage from the first frequency divider is supplied over lead 30 to one input of the B delay circuits 60, and over lead 31 to one of the inputs of the A delay circuits 55. The output voltage from the third frequency divider is supplied over lead 35 to another input of the A delay circuits 55, and over the lead 36 to a second input of the B delay circuits. The output voltage from the fourth frequency divider is supplied over lead 39 to a third input of the B delay circuits. The output voltage from the transient delay circuit is coupled over lead 50 to the input of the square-wave generator 51, and over lead 52 to the sweep circuits 106.

The basic pulse repetition rates used in loran are 33⅓, 25 and 20 cycles per second, and are identified by the letters H, L, and S. These pulse repetition rates are provided in the oscillator-divider circuits 25 by the basic PRR switch S–8 coupled over lead 40 to the fifth frequency divider of the oscillator-divider circuits. This switch S–8 controls the frequency division of the fifth frequency divider to provide a division of 3 for the rate H, 4 for the rate L, and 5 for the rate S. In addition to the three basic pulse repetition rates H, L, and S, seven additional specific pulse repetition rates identified as 0 through 7 are employed in loran. The specific PRR switch S–1 controls the feedback of pulses from the output of the fifth frequency divider to the inputs of the second and third frequency dividers to provide these specific rates in the oscillator-divider circuits 25.

A reactance tube circuit 48 is coupled to the 100 kilocycle-per-second crystal oscillator, and corrects the frequency of this oscillator in response to an automatic frequency control voltage supplied over lead 49 from the A. F. C. circuits of the present invention, as will be explained more fully hereinafter.

Square-wave generator

The positive output pulse voltage on lead 50 from the oscillator and divider circuits is differentiated at the two inputs of an Eccles-Jordan circuit used as a square-wave generator 51 to produce a square-wave output voltage whose frequency is equal to one-half the repetition frequency of the differentiated triggering pulses. The frequency of this square-wave voltage corresponds to the pulse repetition frequency of the loran signals. The mark and space time intervals of the square-wave voltage are each equal to 20,000 microseconds for the selected loran pulse repetition rate L0. The square-wave output voltage from generator 51 is supplied to a push-pull cathode follower 53.

Cathode follower 53 produces two square-wave output voltages, one inverted in phase with respect to the other. One of these square-wave voltages is supplied over lead 54 to the input of the A delay circuits 55 and to the B delay circuits 60, and over lead 439 to the A. F. C. selector circuits of the present invention. The other square-wave voltage is supplied over lead 56 to operations switch S–3C. Both of the square-wave voltages are supplied to the relay driver 132. The negative half-cycle of the square-wave voltage on lead 54 energizes the A delay circuits 55, and this voltage is subsequently synchronized with respect to the received loran signals so as to correspond with the time interval during which the A pulses from the master station arrive at the receiver 12. The positive half-cycle of the square-wave voltage on lead 54 energizes the B delay circuits 60, and corresponds to the time interval during which the B pulses from the slave station will arrive at the receiver.

A delay circuits

The A delay circuits 55 comprise a pedestal delay circuit and a pedestal synchronizer, as is more fully described in the aforesaid Patent 2,651,033. The square-wave voltage on lead 54 is differentiated to produce negative trigger pulses coincident with the trailing or "negative going" edges of the square-wave voltage, and these negative trigger pulses initiate the pedestal delay circuit. The voltage on lead 35 from the third frequency divider is also differentiated and applied to the pedestal delay circuit to terminate the pedestal delay circuit by the first of the trigger pulses to arrive following the initiation of the pedestal delay circuit. The output from the pedestal delay circuit is a series of positive pulses of one-thousand microseconds duration and whose recurrence interval equals the recurrence interval of the square-wave voltage on lead 54.

Both positive and negative output pulses from the pedestal delay circuit are applied to the "left-right" switch S–7. The positive pulses are coupled through the "left" position of switch S–7 and through position 1 of switch S–3F to the input of the third frequency divider over the lead 47 to delay the triggering of the third frequency divider by one more of its 200 microsecond input pulses. This causes an increase in the recurrence interval of the output pulses from the fifth divider which results in an increase in the recurrence interval of the sweep voltage applied to the cathode-ray tube indicator circuits 111. This increase in sweep recurrence interval causes the received loran pulses to drift slowly across the face of the cathode-ray tube toward the left. Conversely, the negative pulses from the pedestal delay circuit are coupled to the "right" position of switch S–7 and through position 1 of switch S–3F and over lead 47 to the input of the third frequency divider in order to pretrigger this divider by one less of its 200 microsecond input pulses. This reduction in recurrence interval results in a shorter sweep recurrence interval thereby causing the received loran pulses delineated upon the face of the cathode-ray tube to drift slowly across the face of the tube toward the right. When the "left-right" switch S–7 is in its neutral position, there is no feedback of pulses and consequently there is very little if any drift of the delineated loran pulses.

The pedestal synchronizer is triggered by negative pulses derived from and coincident with the trailing edges of the positive output pulses from the pedestal delay circuit. The pedestal synchronizer is terminated by the first of the fifty microsecond negative trigger pulses on lead 31 to arrive following the initiation of the pedestal synchronizer. The output from the pedestal synchronizer is a series of positive pulses of approximately fifty microseconds duration and whose recurrence interval equals the recurrence interval of the square-wave voltage on lead 54. The trailing edges of these output pulses are delayed approximately one thousand and fifty microseconds from the trailing edges of the square-wave voltage on lead 54, and the timing of the trailing edges of these output pulses is under the accurate control of the pulses on lead 31 from the first frequency divider. These recurrent output pulses are coupled over lead 59 to the input of pedestal circuits 99.

B delay circuits

The B delay circuits 60 are similar to those shown and described in the aforesaid application S. N. 633,473, and are identical to those shown and described in the aforesaid Patent 2,651,033. The function of the B delay circuits 60 is to produce recurrent variably delayed output pulses whose recurrence interval is equal to the recurrence interval of the square-wave voltage on lead 54, and whose time delay with respect to the recurrent output pulses from the A delay circuits 55 is adjustable by accurately known amounts indicated on a time difference counter 89. This time delay difference is established with an absolute accuracy better than 1 microsecond. The recurrent variably delayed output pulses from B delay circuits 60 occur during the time interval that the half-cycle of the square-wave voltage on lead 54 is positive. The recurrent output pulses from the A delay circuits occur during the time interval that the half-cycle of the square-wave voltage on lead 54 is negative. Therefore, a fixed time delay exactly equal to one-half the recurrence interval of the square-wave voltage on lead 54 exists between the recurrent pulses from the B delay circuits 60 and the recurrent pulses from the A delay circuits 55 in addition to the variable time delay introduced by the B delay circuits.

The recurrent variably delayed output pulses on lead 88 from the B delay circuits 60 are approximately 30 microseconds in duration, and are variable in time relative to the leading edges of the square-wave voltage on lead 54 smoothly and unambiguously over the range of from 1,050 to almost 20,000 microseconds. Moreover, the trailing edges of these variably delayed pulses vary in time relative to the trailing edges of the output pulses from the A delay circuits 55 on lead 59 smoothly and continuously over the range of exactly 0 to almost 20,000 microseconds plus exactly one-half the recurrence time interval of the received loran A and B pulses under the control of the course delay switch S–9 and the fine delay control knob 96.

*Pedestal circuits*

The pedestal circuits 99 comprise a pulse mixer and a pedestal generator. Negative trigger pulses derived by differentiating the trailing edges of the positive recurrent output pulses on lead 59 are combined with negative trigger pulses derived by differentiating the trailing edges of the positive recurrent output pulses on lead 88 in the pulse mixer. Each of these negative trigger pulses initiate the pedestal generator, a monostable multivibrator, which is terminated automatically by its own action. The pedestal generator provides a separate positive and a negative pulse output voltage. These pedestal pulses are of approximately 1,300 microseconds duration for positions 1 and 2 of operation switch S–3B, and are approximately 175 microseconds duration for position 3 of S–3B. The positive pedestal output pulses are supplied over lead 103 to the arm of operations switch S–3C, and also to terminals 2 and 3 of switch S–3A. The pedestal pulses initiated by the pulse voltage on lead 59 produce the A pedestal, and the variably delayed pedestal pulses initiated by the pulse voltage on lead 88 produce the B pedestal. The square-wave voltage from the cathode follower 53 appearing on lead 56 is combined with the positive pedestal pulses on lead 103. The negative pedestal pulses are supplied over lead 105 to the sweep circuits 106, and also to one input of the A. F. C. delay 117.

*Sweep circuits*

The sweep circuits 106 include a gate generator, a sweep generator for producing a slow, medium, or fast sweep-speed voltage, and a sweep restorer. Trigger pulses produced from the trailing edges of the recurrent output voltage from the oscillator-divider circuits 25 on lead 52 initiate the sweep generator to produce the slow sweep-speed voltage. When the switch S–3E is in position 1, this slow sweep-speed voltage is supplied to one input of the cathode-ray tube indicator circuits 111. The medium and fast sweep-speed voltages are produced when the operation switch S–3E is in the positions 2 and 3, respectively, and these sweep voltages are initiated by the recurrent negative pedestal pulses supplied over lead 105. The sweep generator produces a linear, medium sweep-speed voltage coincident with and for the duration of the recurrent negative pedestal pulses when switch S–3E is set to position 2. Similarly, the fast sweep-speed voltage is coincident with and extends for the duration of the recurrent negative pedestal pulses when the operation switch S–3 is set to position 3.

Network 110 coupling basic PRR switch S–8 with switch S–3G serves to maintain the amplitudes of the three sweep-speed voltages of constant value for the three basic pulse repetition rates H, L, or S. The sweep restorer included within the sweep circuits 106 clamps the lower edges of the three sweep-speed voltages to a reference voltage level to insure that the cathode-ray trace on the face of the cathode-ray tube starts from the same point on the face for each of the three sweep voltages.

*Cathode-ray tube indicator circuits*

The cathode-ray tube indicator circuits 111 include a cathode-ray tube, a horizontal sweep amplifier, a vertical amplifier, and an intensity restorer. The sweep voltages from the sweep circuits 106 are amplified in the horizontal sweep amplifier and applied to the horizontal deflection plates of the cathode-ray tube 113. The vertical amplifier amplifies the composite voltage consisting of the pedestal pulses on lead 103, the square-wave voltage on lead 56, and the received loran A and B pulses on lead 22, and supplies these voltages to the vertical deflection plates of the cathode-ray tube 113. The pedestal pulses on lead 103 are supplied through positions 2 and 3 of switch S–3A to the input of the intensity restorer. The restorer clamps the upper edges of these positive pedestal pulses to a fixed voltage level corresponding to normal intensity of the cathode-ray trace on the face of the cathode-ray tube, and the negative portions of these pedestal pulses, corresponding to the time intervals between sweeps, bias the control-grid of the cathode-ray tube so as to blank the cathode-ray beam.

*Automatic amplitude balancing circuits*

The automatic frequency control system of the present invention is intercoupled with the automatic amplitude balance control system, and the two systems are dependent upon each other. Accordingly, the part of the A. F. C. system to which the AABC circuits are coupled will be described before proceeding into the description of the AABC circuits. The complete description of the A. F. C. system will appear hereinafter.

The A. F. C. circuits 116 of the aforesaid Patent 2,651,033 include an A. F. C. delay and an A. F. C. amplifier which are identical to the A. F. C. delay 117 and A. F. C. amplifier 118 employed in the present invention. Negative trigger pulses derived from the leading edges of the negative A and B pedestal pulses on lead 105 initiate the A. F. C. delay circuit 117, a mono-stable or one-shot multivibrator. This delay circuit produces recurrent negative output pulses of approximately 100 microseconds duration. These pulses are supplied to a differentiating circuit 422 and over lead 127 to another differentiating circuit 423 at one input of gain synchronizer 350.

Received positive A and B pulses from receiver 12 are supplied over lead 23 to the A. F. C. amplifier 118. Switch S–4 places the A. F. C. system in operation. The positive A and B pulses are amplified and inverted by amplifier 118, and are applied to a first phase inverter 425 and over lead 129 to a second phase inverter 351. The output of the A. F. C. amplifier is grounded by left-right switch S–7 coupled to the A. F. C. amplifier 118 over lead 120. The A. F. C. operation is thus disabled during the left or right positions of switch S–7 to insure proper operation of the left-right drift circuits.

The automatic amplitude balancing circuits now to be described are identical to those described and claimed in application Serial No. 403,771, filed January 13, 1954, now Patent No. 2,732,549, issued January 24, 1956, in the name of Wilbert P. Frantz, entitled Automatic Amplitude Balance Control System for Hyperbolic Navigation Receivers and assigned to the same assignee as the present invention. The 100 microsecond recurrent pulses on lead 127 are differentiated by the differentiating circuit 423. The differentiating circuit produces first and second positive output trigger or sampling pulses from the trailing edges of the recurrent negative 100 microsecond pulses. The first positive sampling pulses are delayed 100 microseconds from the leading edges of the negative A pedestal pulses on lead 105, and the second positive sampling pulses are delayed 100 microseconds from the leading edges of the negative B pedestal pulses on lead 105. The first and second positive sampling pulses energize the gain synchronizer 350. These positive sampling pulses may be amplified if desired before application to the gain synchronizer 350. The gain synchronizer may be of the four-diode switch type as shown in Fig. 10.10 on page 374 of the book "Waveforms," published by the McGraw-Hill Book Company, 1949. Phase inverter 351 inverts the phase of the loran A and B pulses on lead 129, and supplies positive A and B pulses to another input of gain synchronizer 350.

The gain synchronizer produces first recurrent output pulses of current whose amplitude varies according to the relative time position or coincidence between the first positive sampling pulses and the loran A pulses, and produces second recurrent output pulses of current whose amplitude varies according to the relative time position between the second positive sampling pulses and the loran B pulses. The first positive sampling pulses are made to occur coincident with the cross-over of the differentiated A pulses by action of the A. F. C. system to be described hereinafter. Accordingly, these particular positive sampling pulses occur at instants corresponding to the peak of the received loran A pulses. The output pulses of current from the gain synchronizer which result from the coincidence of the first positive sampling pulses and the A pulses vary according to the peak value of the A pulses.

In a similar manner, the second positive sampling pulses are brought into coincidence with the loran B pulses to produce output current pulses from the gain synchronizer which vary according to the peak value of the B pulses. Since the second positive sampling pulses are derived from the variably-delayed B pedestal pulses on lead 105, they are likewise variably-delayed pulses. In order to bring the second positive sampling pulses into coincidence with the received loran B pulses, the time position of these positive pulses is varied under the control of coarse delay switch S-9 or the fine delay knob 96 of the B delay circuits 60 in order to match the received loran A and B pulses on the face of the cathode-ray tube 113 as in the normal operating procedure. When the A and B pulses are properly matched on the face of the cathode-ray tube 113, the second positive sampling pulses are coincident with the peak value of the received loran B pulses.

The first and second recurrent output pulses from the gain synchronizer 350 are coupled to the armature or movable contact 130 of relay 131. The winding of relay 131 is energized by the square-wave voltage from the relay driver 132. The armature 130 of relay 131 vibrates in synchronism with the square-wave voltage to separate the first recurrent output pulses from the second recurrent output pulses. The first output pulses of current varying according to the amplitude of the A pulses are supplied to a condenser 352, and the second output pulses of current varying according to the amplitude of the received B pulses are supplied to a condenser 353. The condenser 352 is charged to a potential varying according to the value of the first current pulses, and the condenser 353 is charged to a potential varying according to the second current pulses. The armature 130 of relay 131 alternates between the charged potential on condenser 352 and the charged potential on condenser 353 at the frequency of the square-wave voltage supplied to the relay 131. This alternating voltage on armature 130 is the automatic amplitude balance control voltage, as is more fully explained in the aforesaid pending application Serial No. 403,771, and this AABC voltage is supplied through the AABC amplifier circuits 382 to the amplitude balance restorer in receiver 12.

Control box 135 includes an automatic balance control on-off switch 136, a manual gain control 137, and a manual amplitude balance control 138, as explained in the aforesaid Patent No. 2,651,033. When the switch 136 is in the off position, the control box supplies manually adjustable control voltages across each condenser 352 and 353. The manual gain control 137 raises and lowers the applied control voltages together, and the manual amplitude balance control 138 raises the voltage supplied to one condenser while lowering the voltage supplied to the other condenser.

*Automatic gain control circuits*

The automatic gain control circuits are identical to those described and claimed in application Serial No. 403,852, filed January 13, 1954, now Patent No. 2,728,-908, issued December 27, 1955, in the name of Wilbert P. Frantz, entitled Automatic Gain Control System for Hyperbolic Navigation Receivers, and assigned to the same assignee as the present invention.

The potential across condenser 352 is supplied over lead 357 to one input of the AGC circuits 356, and the potential across condenser 353 is supplied over lead 358 to a second input of the AGC circuits 356. The AGC circuits are responsive to the potentials across condensers 352 and 353 to produce a direct output control voltage which varies according to the magnitude of the smaller of the direct potentials across these condensers. The AGC voltage varying according to the magnitude of the smaller of the direct potentials across the condensers 352 and 353 is supplied to receiver 12 to control its gain.

*Automatic frequency control system*

The automatic frequency control system of the present invention includes the aforesaid A. F. C. delay 117, A. F. C. amplifier 118, and further includes differentiating circuits 422 and 424, phase inverter 425, A. F. C. synchronizer 426, and the A. F. C. voltage selector circuits contained within box 427. The negative 100 microsecond output pulses from the A. F. C. delay 117 are differentiated by the differentiating circuit 422. The differentiating circuit produces first and second positive output trigger or sampling pulses from the trailing edges of the negative 100 microsecond pulses in the same manner as described above in connection with the AABC circuits. These positive sampling pulses whose pulse duration is approximately 5 microseconds may be amplified if desired before application to the A. F. C. synchronizer 426. The A. F. C. synchronizer may be of the four-diode switch type shown on page 374 of the aforementioned book "Waveforms."

Phase inverter 425 inverts the amplified loran A and B pulses from A. F. C. amplifier 118 and supplies positive A and B pulses to differentiating circuit 424. The differentiating circuit produces bidirectional output pulses from each of the applied A and B pulses, and these bidirectional pulses have a waveform varying according to the slope or derivative of the A and B pulses. Thus, each bidirectional pulse is similar in appearance to a single cycle of a sinusoidal wave, as more fully explained in the aforesaid Patent 2,636,988. Accordingly, the wave form of each bidirectional pulse passes through zero at a time corresponding to the peak value of the A and B pulses since the slope at the peak of each A and B pulse is zero. The differentiated A and B pulses may be amplified if desired before application to one of the inputs of A. F. C. synchronizer 426.

The A. F. C. synchronizer 426 produces first and second recurrent output pulses of current. The magnitude of the first pulses varies according to the relative time position or coincidence between the applied differentiated A pulses and the applied first positive sampling pulses. The magnitude of the second pulses of current varies according to the relative time position or coincidence between the applied differentiated B pulses and the second positive sampling pulses. These first and second pulses of current are applied to the armature or movable contact 121 of relay 122. The relay is energized by the square-wave voltage from the relay driver 132 to separate the first output pulses of current from the second output pulses of current.

The first output pulses, varying according to the relative time position of the differentiated A pulses with respect to the first positive sampling pulses, are applied to a first integrating network or filter at one input of the A. F. C. selector circuits 427. The second output pulses, varying according to the relative time position of the differentiated B pulses with respect to the second positive sampling pulses, are applied to a second integrating network or filter at another input of the A. F. C. selector circuits. The first filter includes resistor 428 and condensers 429 and 430, and the second filter similarly includes resistor 431 and condensers 432 and 433. The first filter integrates the first output current pulses to produce a first frequency control output voltage and the second filter integrates the second output current pulses to produce a second frequency control output voltage.

The frequency control output voltage produced by the stronger of the received A and B pulses is selected by relay 434 in a manner now to be described. When relay 434 is unenergized, the armature or movable contact 435 reecives the frequency control voltage at the output of the first filter produced by the received A pulses. When the relay 434 is energized, the armature or movable contact 435 is deflected upward to receive the frequency control voltage at the output of the second filter produced by the received B pulses. One terminal of the relay is coupled through switch 436 to a source of positive potential and the other terminal is coupled to the anode 437 of switch tube 438.

The switch tube 438 is controlled by a negative bias voltage derived from two applied square-wave voltages. The first or reference square-wave voltage is obtained from the output of cathode follower 53, and is supplied to the A. F. C. selector circuits 427 over lead 439. This reference square-wave voltage is applied through isolating resistor 440 and condenser 441 to a rectifier 442. The rectifier 442 conducts during positive half-cycles of the reference square-wave voltage thereby charging condenser 441. The rectified square-wave voltage across the rectifier 442 is supplied to a low-pass filter including series resistor 443 and shunt condenser 444 where it is filtered to produce a negative bias control voltage across condenser 444 between control-grid 445 and cathode 446 of switch tube 438. This negative bias voltage is of such magnitude as to allow tube 438 to conduct or pass a small direct current, but the magnitude of this current is insufficient to actuate relay 434. Accordingly, the armature or movable contacts remains in the position shown to receive the frequency control voltage produced by the received A pulses.

A second square-wave voltage obtained from the output of the AABC amplifier circuits 382 is supplied to the A. F. C. selector circuits over lead 447. This second voltage is applied through isolating resistor 448 and condenser 449, and is combined with the reference square-wave supplied over the lead 439. The second square-wave voltage on lead 447 is related in phase to the reference square-wave voltage, and is either in phase or 180 degrees out of phase with the reference voltage. The positive half-cycle of the reference square-wave from cathode follower 53 on leads 54 and 439 represents the time interval during which the B pulses from the slave station arrive at the receiver, as taught in the aforesaid Patent 2,651,033. When the magnitude of the received B pulses is stronger than the magnitude of the received A pulses, the AABC voltage on lead 447 will be 180 degrees out of phase with the reference voltage on lead 439. This phase relation exists because the AABC voltage is more negative during reception of the stronger B pulses than during reception of the A pulses in order to reduce the gain of receiver 12 during the time interval of reception of the B pulses. For this condition, the sum of the two applied square-wave voltages on leads 439 and 447 is smaller than the reference voltage alone, and the rectified negative grid bias voltage becomes less negative. The resulting increase in plate current in tube 438 and through relay 434 caused by the reduced grid bias voltage actuates relay 434 to select the frequency control voltage across condenser 433 produced by the stronger received B pulses.

For the condition when the received A and B pulses are substantially equal in strength and the AABC voltage on lead 447 is zero, the current flowing through relay 434 is insufficient to actuate the relay as previously explained, and the relay selects the frequency control voltage across condenser 430 produced by the A pulses.

For the condition when the received A pulses are stronger in magnitude than the received B pulses, the AABC voltage on lead 447 is in phase with the square-wave reference voltage and the sum of the two applied voltages is larger than the reference voltage alone. Accordingly, the rectified negative bias voltage becomes larger in magnitude thereby causing less current to flow through tube 438 and relay 434. The relay remains unenergized and selects the frequency control voltage produced by the received A pulses.

The selected frequency control voltage produced by the stronger of the received A or B pulses is applied through isolating resistor 450 to control-grid 451 of triode tube 452. Anode 453 is coupled to a source of positive potential. Cathode 454 is coupled through resistor 455, potentiometer 456, and resistor 457 to a source of negative potential. Triode tube 452 operates as a cathode follower and couples the selected frequency control voltage to reactance tube 48 over lead 49. The selected frequency control voltage on lead 49 automatically controls the frequency of the precision timing oscillator of the oscillator and divider circuits 25 in accordance with the stronger of the received A or B pulses.

The magnitude of the selected frequency control voltage on lead 49 is under the independent manual control of the drift potentiometer 456, and the "left-right" switch S–7. The "left-right" switch S–7 provides two fixed negative control voltages of different magnitudes for biasing reactance tube 48, in addition to supplying feedback pulses to the third frequency divider through switch S–3F as explained heretofore in connection with the A delay circuits 55. In the "left" position of switch S–7, one of these negative control voltages causes the delineated pulses on the face of the cathode-ray tube 113 to drift slowly across the face of the tube to the left, while in the "right" position of switch S–7 the other negative control voltage causes a drift of the delineated loran pulses to the right. The drift potentiometer 456 provides an adjustable negative control voltage for slowly drifting the delineated loran pulses either to the right or to the left. These manual controls facilitate the alignment of the received loran A and B pulses atop their respective A and B pedestals.

The loran receiver-indicator with the improved automatic frequency control system of the present invention is adjusted by an operator to obtain useful navigation information in an identical manner as explained in the aforesaid Patent 2,651,033 under the section entitled Operation of the Improved Loran Receiver-Indicator. It is important to note that the received A and B pulses must be properly matched on the face of the cathode-ray tube indicator in order that a suitable AABC voltage is available for use by the improved automatic frequency control system of the present invention. After the received A and B pulses are matched, the improved A. F. C. system may be switched on by closing switch 436. Thereafter, the A. F. C. system will automatically select the frequency control voltage produced by the stronger of the received A and B pulses.

The improved A. F. C. system of the present invention is not limited solely to manually operated loran receiver-indicators but is especially well suited for use in the automatic tracking loran receiver-indicator of the aforementioned application S. N. 267,347 now Patent 2,697,219.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a radio navigation receiver responsive to recurrent A pulses transmitted from a master station and to recurrent B pulses transmitted from a slave station, wherein the strength of the received recurrent A pulses may be different from the strength of the received recurrent B pulses, said receiver including an electrically controllable precision timing oscillator: an automatic frequency control system comprising means coupled to the output of the receiver for differentiating the received A and B pulses, synchronizer means coupled to the output of said differentiating circuit for receiving said differentiated A and B pulses, means coupled to said precision timing oscillator for producing first recurrent pulses adapted to be synchronized to said received differentiated A pulses, means coupled to the output of said precision timing oscillator for producing delayed second recurrent output pulses adapted to be synchronized to said received differentiated B pulses, means coupling said first and second recurrent pulses to said synchronizer means, said synchronizer means producing a first frequency control output voltage varying according to the relative time difference between said first pulses and said differentiated A pulses, and producing a second frequency control output voltage varying according to the relative time difference between said second pulses and said received differentiated B pulses, means coupled to the output of said synchronizer means for switching said first frequency control output voltage into a first channel during reception of said recurrent A pulses and switching said second frequency control output voltage into a second channel during reception of said recurrent B pulses, selective means coupled to said switching means and receiving said first and second frequency control output voltages therefrom, means coupled between the output of said receiver and said selective means and being responsive to the relative strengths of said received A and B pulses for energizing said selective means, said selective means selecting the frequency control output voltage produced by the stronger of said received A and B pulses, and means responsive to said selected frequency control voltage for controlling the frequency of said electrically controllable precision timing oscillator.

2. In a radio navigation receiver responsive to recurrent A pulses transmitted from a master station and to recurrent B pulses transmitted from a slave station, wherein the strength of the received recurrent A pulses may be different from the strength of the received recurrent B pulses, said receiver including an electrically controllable precision reference oscillator means: an automatic frequency control system for synchronizing said oscillator means with the stronger of said received recurrent A and B pulses, comprising in combination, means coupled to the output of said receiver and responsive to the relative strengths of said received output A and B pulses for producing an alternating output voltage whose phase is determined by the stronger of said received A and B pulses, means including a synchronizer means coupled to the output of said receiver and to the output of said oscillator means, means coupling the alternating output voltage from said responsive means to said means including said synchronizer means for actuating said synchronizer means during reception of the stronger of said received A and B pulses, said synchronizer means producing an output frequency control voltage varying according to the relative time difference between the stronger of said received A and B pulses and the output from said oscillator means, and means coupling said output frequency control voltage to said electrically controllable precision reference oscillator means for controlling the frequency thereof.

3. An automatic frequency control system including an oscillator means adapted to be synchronized with the stronger of first and second applied recurrent pulses, comprising in combination, pulse coincidence means adapted to receive applied first and second recurrent pulses, means coupling a first output voltage from said oscillator means to said pulse coincidence means, time delay means coupled to the output of said oscillator means for producing a delayed output voltage, means coupling said delayed output voltage to said pulse coincidence means, said pulse coincidence means producing first and second output frequency control voltages, said first frequency control voltage varying according to the relative time difference between said recurrent first pulses and the first output voltage from said oscillator means, said second output frequency control voltage varying according to the relative time difference between said applied recurrent second pulses and the output voltage from said time delay means, selective means coupled to the output of said pulse coincidence means, said selective means being responsive to the relative strengths of said applied first and second recurrent pulses for selecting the particular frequency control voltage from the ouput of said pulse coincidence means produced by the stronger of said applied first and second recurrent pulses, and means responsive to said selected frequency control voltage for controlling the frequency of said oscillator means.

4. An automatic frequency control system comprising in combination, means including an oscillator means adapted to be synchronized with the stronger of first and second applied voltage waves, said means including said oscillator means producing a first output voltage and a second output voltage delayed in phase with respect to the first output voltage, responsive means adapted to receive said applied first and second voltage waves, said responsive means being coupled to the output of said means including said oscillator means, said responsive means producing a first frequency control output voltage varying according to the relative phase displacement between said applied first voltage wave and said first output voltage from said means including said oscillator means, and producing a second output frequency control voltage varying according to the relative phase displacement between said applied second voltage wave and said delayed second output voltage from said means including said oscillator means, selective means coupled to the output of said responsive means for receiving said first and second frequency control output voltages, means coupled to said selective means and being responsive to the relative strengths of said applied first and second voltage waves for energizing said selective means, said selective means selecting the frequency control output voltage from said responsive means produced by the stronger of said applied first and second voltage waves, and means coupling said selected frequency control output voltage to said means including said oscillator means for controlling the frequency of said oscillator means.

5. An automatic frequency control system comprising in combination, an oscillator means adapted to be synchronized with the stronger of first and second applied voltage waves, means including phase responsive means adapted to receive said first and second applied voltage waves, means coupling an output voltage from said oscillator means to said means including said phase responsive means, said means including said phase responsive to said output voltage and means being responsive to the relative strengths of said first and second applied voltage waves and producing a frequency control output voltage varying according to the relative phase displacement between the stronger of said first and second applied voltage waves and the output voltage from said oscillator means, and means intercoupled between the output of said means including said phase responsive means and said oscillator means, said means being responsive to said frequency control output voltage for controlling the frequency of said oscillator means.

6. An automatic frequency control system comprising in combination, means producing recurrent pulses including a first pulse occurring during a first time interval and a second pulse occurring during a second time interval wherein the magnitude of said recurrent first pulses may be different from the magnitude of said recurrent second pulses, oscillator means adapted to be synchronized with one of said first or second recurrent pulses from said pulse producing means, responsive means coupled to the output of said oscillator means and to the output of said pulse producing means, time delay means coupled to the output of said oscillator means, means coupling the output of said time delay means to said responsive means, said responsive means producing a first frequency control output voltage varying according to the relative time difference between said recurrent first pulses and the output from said oscillator means and producing a second frequency control output voltage varying according to the relative time difference between said recurrent second pulses and the output from said time delay means, selective means coupled to the output of said responsive means and receiving said first and second frequency control voltages, means intercoupled between said pulse producing means and said selective means for energizing said selective means to select one of said first and second frequency control output voltages, and means intercoupled between said selective means and said oscillator means and responsive to said selected frequency control output voltage for controlling the frequency of said oscillator means.

7. An automatic frequency control system comprising in combination, means including an oscillator means adapted to be synchronized with the stronger of first and second applied voltage waves, responsive means adapted to receive said applied first and second waves, said responsive means being coupled to the output of said means including said oscillator means, said responsive means producing a first frequency control output voltage varying according to the relative phase displacement between said applied first voltage wave and a first output voltage from said means including said oscillator means, and producing a second output frequency control voltage varying according to the relative phase displacement between said applied second voltage wave and a second output voltage from said means including said oscillator means, selective means coupled to the output of said responsive means for receiving said first and second frequency control output voltages, means coupled to said selective means and being responsive to the relative strengths of said applied first and second voltage waves for energizing said selective means, said selective means selecting the frequency control output voltage from said responsive means produced by the stronger of said applied first and second voltage waves, and means for coupling said selected frequency control output voltage to said means including said oscillator means for controlling the frequency of said oscillator means.

8. A radio navigation receiver responsive to recurrent A pulses transmitted from a master station and to recurrent B pulses transmitted from a slave station, wherein the strength of the received recurrent A pulses may be different from the strength of the received recurrent B pulses, comprising an electrically controllable oscillator means adapted to be synchronized with the stronger of said received recurrent A and B pulses, said oscillator means operating at a higher frequency than the pulse repetition frequency of said received pulses, frequency divider means coupled to said oscillator means, said frequency divider means producing first recurrent output pulses of substantially the same pulse repetition rate as said received recurrent A pulses, time delay means coupled to said frequency divider means and producing second recurrent output pulses delayed in time relative to said first recurrent output pulses, synchronizer means coupled to the output of said frequency divider means and said time delay means for receiving said first and second recurrent output pulses, means coupling a version of said received recurrent A and B pulses to said synchronizer means, said synchronizer means producing first output control pulses whose magnitude varies according to the relative time difference between said first recurrent output pulses and a version of said received recurrent A pulses and producing second output control pulses whose magnitude varies according to the relative time difference between said second recurrent output pulses and a version of said received recurrent B pulses, means coupled to the output of said synchronizer means for coupling said first control pulses into a first channel and for coupling said second control pulses into a second channel, means included within said first channel for storing said first output control pulses, said means producing a first output frequency control voltage varying according to the magnitude of said first output control pulses, means included within said second channel for storing said second output control pulses, said means producing a second output frequency control voltage varying according to the magnitude of said second output control pulses, selector means coupled to the output of said first and second channels and being adapted to receive said first and second output frequency control voltages, responsive means coupled between the output of said navigation receiver and said selector means, said responsive means producing an output control signal varying according to the relative strengths of said received recurrent A and B pulses, said output control signal energizing said selector means to select the output frequency control voltage from one of said channels produced by the stronger of said received recurrent A and B pulses, and means coupling said selected output frequency control voltage to said electrically controllable oscillator means for automatically controlling the frequency thereof to maintain said oscillator means synchronized with the stronger of said received recurrent A and B pulses.

9. In a radio navigation receiver responsive to recurrent A pulses transmitted from a master station and to recurrent B pulses transmitted from a slave station, wherein the strength of the received recurrent A pulses may be different from the strength of the received recurrent B pulses, said receiver including an electrically controllable precision reference oscillator means and a variable-delay pulse generator means coupled to said precision reference oscillator: an automatic frequency control system for synchronizing said precision reference oscillator means with the stronger of said received recurrent A and B pulses, comprising in combination, pulse producing means coupled to the output of said precision reference oscillator for producing first output pulses whose recurrence frequency is substantially equal to the recurrence frequency of said A pulses, said variable-delay pulse generator means producing second output pulses delayed in time with respect to said first output pulses and whose recurrence frequency is substantially equal to the recurrence frequency of said B pulses, means including a synchronizer means coupled to the output of said receiver and to the output of said pulse producing means and said variable-delay pulse generator means, said means including said synchronizer means being adapted for comparing the relative time difference between said received recurrent A pulses and said first output pulses and for comparing the relative time difference between said received recurrent B pulses and said second output pulses, means coupled to the output of said receiver and responsive to the relative strengths of said received output A and B pulses for producing an output control voltage varying in magnitude according to the stronger of said received A and B pulses, means coupling said output control voltage to said means including said synchronizer means for actuating said synchronizer means during reception of the stronger of said received A and B pulses, said means including said synchronizer means producing an output frequency control voltage varying according to the relative time difference between the stronger of said received A and B pulses and the corresponding first and second recurrent pulses, and means coupling said output frequency control voltage to said electrically controllable precision reference oscillator means for maintaining synchronism between the stronger of said received recurrent A and B pulses and the corresponding first and second recurrent pulses.

10. A pulse synchronizing system for synchronizing a precision reference oscillator with the stronger of applied recurrent A pulses and delayed recurrent B pulses, comprising in combination, pulse producing means coupled to the output of said reference oscillator for producing first output pulses whose repetition frequency is substantially equal to the repetition frequency of said recurrent A pulses, delay means coupled to the output of said reference oscillator for producing second output pulses delayed in time with respect to said first output pulses and whose repetition frequency is substantially equal to the repetition frequency of said delayed B pulses, means including a gated synchronizer means coupled to the output of said pulse producing means and to the output of said delay means for receiving said first output pulses and said delayed second output pulses, means coupling said applied recurrent A pulses and delayed B pulses to said means including said gated synchronizer means, said gated synchronizer means being adapted for comparing the relative time difference between said recurrent A pulses and said first output pulses during a first time interval and for comparing said delayed recurrent B pulses and said delayed second output pulses during a second time interval, means receiving said applied recurrent A pulses and said delayed B pulses and responsive to the relative strengths of said A and B pulses for producing a control voltage during one of said first or second time intervals varying according to the stronger of said applied A and B pulses, means coupling said control voltage to said means including said gated synchronizer means for actuating said synchronizer means during one of said time intervals, said means including said synchronizer means producing an output frequency control voltage varying according to the relative time difference between the stronger of said applied A and B pulses and the corresponding first and second recurrent output pulses, frequency control means coupled to said precision reference oscillator for varying the repetition frequency of said recurrent first and second output pulses, and means coupling said output frequency control voltage to said frequency control means for maintaining synchronism between the stronger of said recurrent A and delayed B pulses and said corresponding first and delayed second recurrent pulses.

References Cited in the file of this patent

UNITED STATES PATENTS

| | | |
|---|---|---|
| 2,543,256 | Peterson | Feb. 27, 1951 |
| 2,651,033 | Frantz | Sept. 1, 1953 |